United States Patent [19]

Lampard

[11] 3,921,594
[45] Nov. 25, 1975

[54] INTERNAL COMBUSTION ENGINES

[76] Inventor: Robert Douglas Lampard, 23 Kinbrace Way, Lynwood, Australia

[22] Filed: Apr. 1, 1974

[21] Appl. No.: 456,872

[30] Foreign Application Priority Data
Apr. 3, 1973  Australia............................ 2865/73

[52] U.S. Cl.............. 123/8.05; 123/8.45; 123/53 B; 418/175
[51] Int. Cl.²......................................... F02B 53/00
[58] Field of Search ....... 123/8.05, 8.09, 8.11, 8.13, 123/8.45, 32 ST, 32 SP, 53 A, 53 B; 418/183, 177

[56] References Cited
UNITED STATES PATENTS

| | | | |
|---|---|---|---|
| 1,239,523 | 9/1917 | Rogers | 123/53 B |
| 1,273,834 | 7/1918 | Dumanois | 123/53 A UX |
| 1,555,454 | 9/1925 | Bugatti | 123/53 A |
| 2,443,502 | 6/1948 | Guerasimoff | 123/53 B X |
| 3,213,836 | 10/1965 | Keylwert et al. | 123/8.11 |
| 3,292,600 | 12/1966 | Liebel | 123/8.11 |
| 3,699,929 | 10/1972 | Bennethum | 123/8.05 X |

FOREIGN PATENTS OR APPLICATIONS

| | | | |
|---|---|---|---|
| 263,863 | 3/1964 | Australia | 123/8.05 |
| 1,426,036 | 9/1969 | Germany | 123/8.13 |
| 666,222 | 10/1938 | Germany | 123/53 B |

Primary Examiner—Carlton R. Croyle
Assistant Examiner—Michael Koczo, Jr.
Attorney, Agent, or Firm—Flehr, Hohbach, Test, Albritton & Herbert

[57] ABSTRACT

An internal combustion engine in which ignition of a first working fluid charge in a combustion chamber is effected by first igniting a separated second fluid charge and introducing this into the first fluid charge and means being provided for inducing turbulence into the second working fluid charge as it is ignited.

30 Claims, 24 Drawing Figures

INTERNAL COMBUSTION ENGINES

BACKGROUND OF THE INVENTION

1. Field of the Invention

This invention relates to internal combustion engines.

2. Brief Description of the Prior Art

It is known to provide an internal combustion engine of the kind in which the combustion cycle is split in that combustion is first initiated in a first fuel charge and then passed to a second fuel charge to effect combustion of this. The splitting of combustion in this way allows considerable flexibility in designing the combustion cycle of the engine. Thus, if desired the first charge need only be small so that combustion thereof does not contribute to the working stroke. Alternatively, combustion of the first charge might be arranged to make the principal contribution to the working stroke of the engine and, of course, various intermediate arrangements between these two extremes are possible. In one advantageous arrangement, combustion of the first charge can be arranged to generate a substantial flame front which when subsequently passed to the second charge ensures substantially complete burning of the second charge. Difficulty is, however, encountered with engines operating in this manner in that, unless adequate combustion can be initiated in the first charge, there will be insufficient generation of heated gases to ensure that combustion will occur in the second charge. Indeed, combustion efficiency may be no better, or even worse than if the initial charge in the second chamber section part were merely directly ignited by, say, a spark plug. An object of the present invention, in one of its aspects, is to provide an internal combustion engine having a split cycle of combustion and in which this difficulty is at least decreased.

BRIEF SUMMARY OF THE INVENTION

In accordance with the invention there is provided an internal combustion engine of the kind in which combustion is initiated in a first working fluid charge which is then brought into communication with a previously at least substantially separated fuel charge to effect ignition of the second charge characterised in that means is provided for creating turbulence in the first charge as ignition thereof takes place. This may be provided by ensuring that the first charge is ignited in a cavity of a somewhat spherical or cylindrical configuration, at least having a curved substantially re-entrant surface and by providing generally tangential channel means communicating with the cavity and through which, in use of the engine, the working charge is injected to cause thus injected working fluid to strike said surface and be caused to execute rotational movement.

Preferably, said engine is of the kind comprising a housing having a chamber therein and a member in the chamber, the housing and member being relatively rotatable about a longitudinal axis; said member having a longitudinally extending vane received therein for sliding movement transverse to said axis, said vane having opposite longitudinal surfaces which slidingly sealingly engage an endless longitudinal curved peripheral surface of said chamber to divide the chamber into two sections, one to either side of the vane these sections being closed by axial end sealing members associated with the chamber; said member having two cavities therein open to the outer periphery thereof at respective opposite sides of said vane and thereby associated one with each chamber section; inlet and outlet means being provided respectively for admitting working fluid to the chamber and for exhausting working fluid therefrom; the engine being arranged such that, in use, working fluid introduced into a first part of a chamber section undergoes ignition in the cavity associated with that chamber section and is then transferred to a second part of that chamber section which is at least for a period at or prior to ignition substantially separated from communication with that cavity to effect subsequent ignition of further working fluid introduced into said second part. In this case, the said groove means may be in the periphery of the member and may be arranged so that fluid in a cavity passes through these towards the end of a working fluid compression stroke. If desired, another, like, groove may be provided extending forwardly from each cavity to effect ejection of material from a cavity in which combustion is taking place into the associated second chamber section part.

Said member may be so disposed in the housing that the minimum outward extent of the vane from the periphery of the member during said relative rotation is small compared with the distance between opposite sides of said peripheral surface, measured on lines passing through said axis. Particularly, it is preferred that the minimum clearance between the member and housing during rotation be only such as to allow free running between these parts. By this means the surface area exposed to heat during combustion is minimised, and heat losses from the combustion of a fuel charge are minimised.

Preferably, further, said member is in the form of a vane which extends across said chamber to sealingly engage said endless longitudinal curved peripheral surface of the chamber at opposite sides of the vane the vane being provided with longitudinally extending portions, at outer sides thereof which are rotatable relative to the vane about generally longitudinal axes and which portions provide, at outer parts thereof, the said longitudinal sealing surfaces. The said outer parts preferably define surfaces of curvature of complementary configuration to parts of the peripheral surface which are of least curvature. The rotational movement allowed the said longitudinally extending portions allows the constant curvature of the said outer parts to more readily adapt to curvature of the chamber peripheral surface during said relative rotation, even when the curvature of said peripheral surface varies.

The engine may also further include ignition means for igniting working fluid in said cavity associated with the first chamber section part, wherein said ignition means is located in this cavity. By this means the ignition means is always located at a disposition such as to ensure effective operation even when the engine timing is altered. Preferably, the last-mentioned cavity is longitudinally extending and the ingition means is at one end thereof.

BRIEF DESCRIPTION OF THE SEVERAL VIEWS OF THE ACCOMPANYING DRAWINGS

The invention is now described in detail with reference to the accompanying drawings in which.

Figure 1:
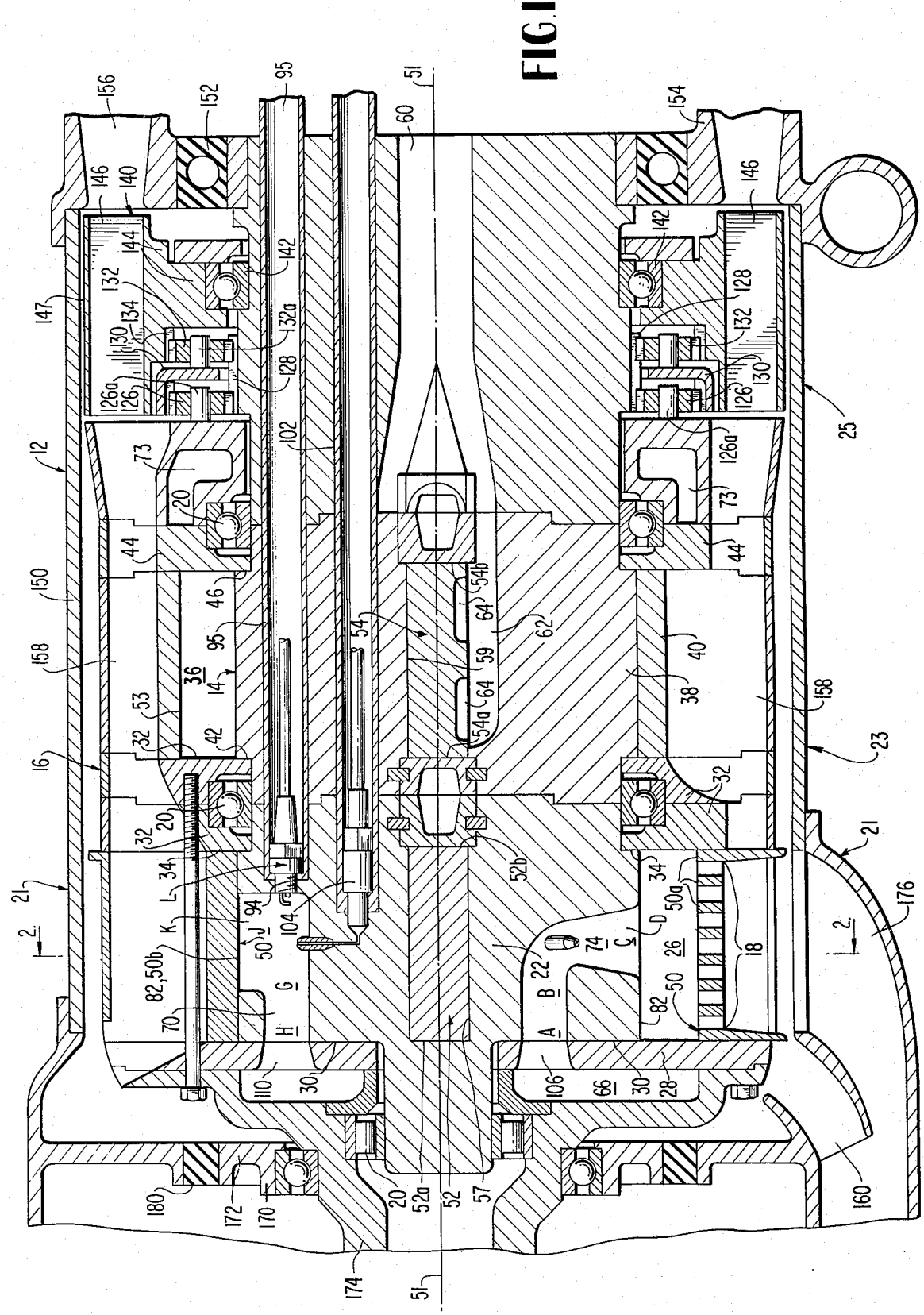
FIG. 1 is a longitudinal cross-section of an engine constructed in accordance with the invention.
Figure 2:
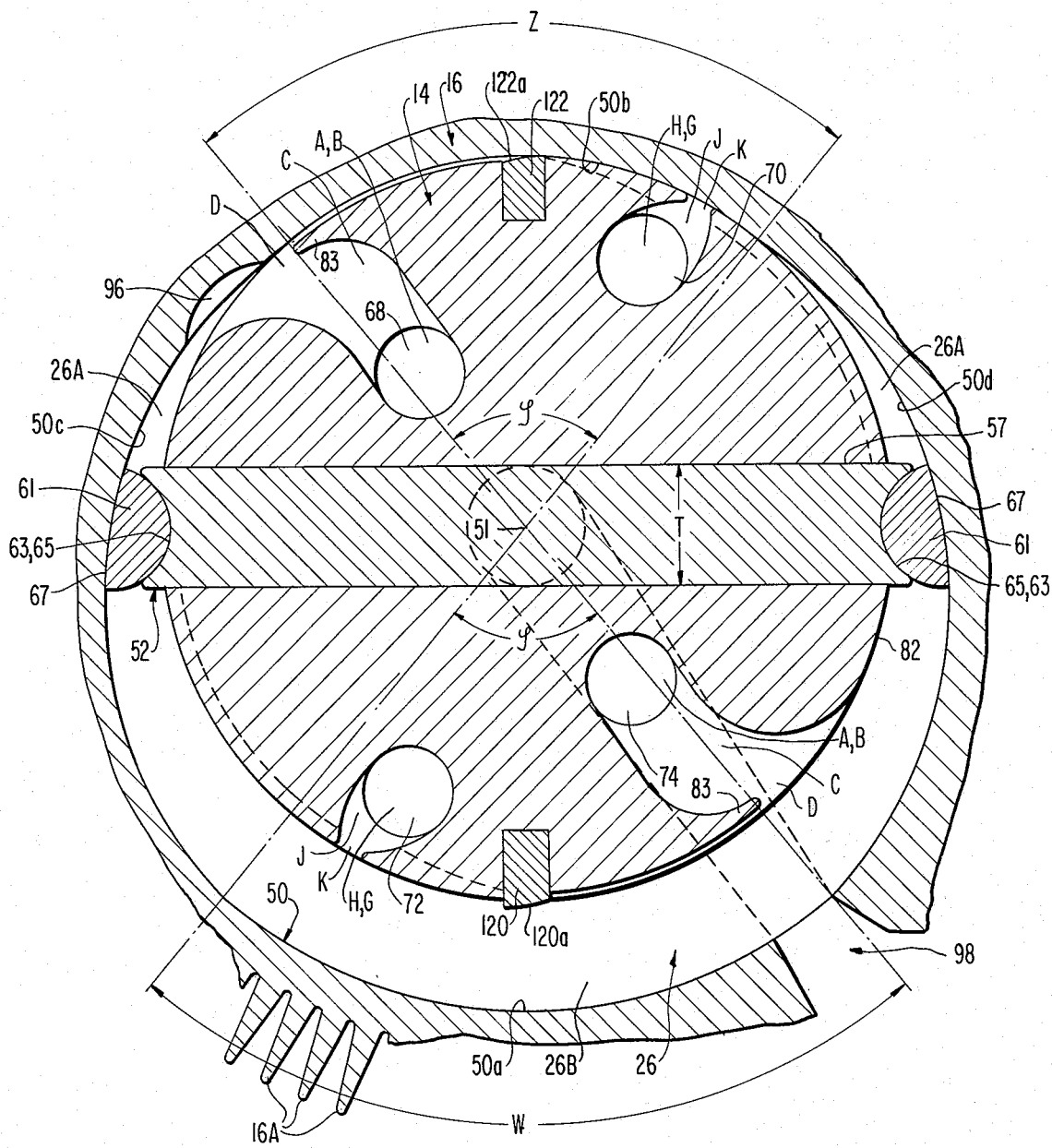
FIG. 2 is a transverse cross-section on the line 2—2 in FIG. 1.
Figure 17:
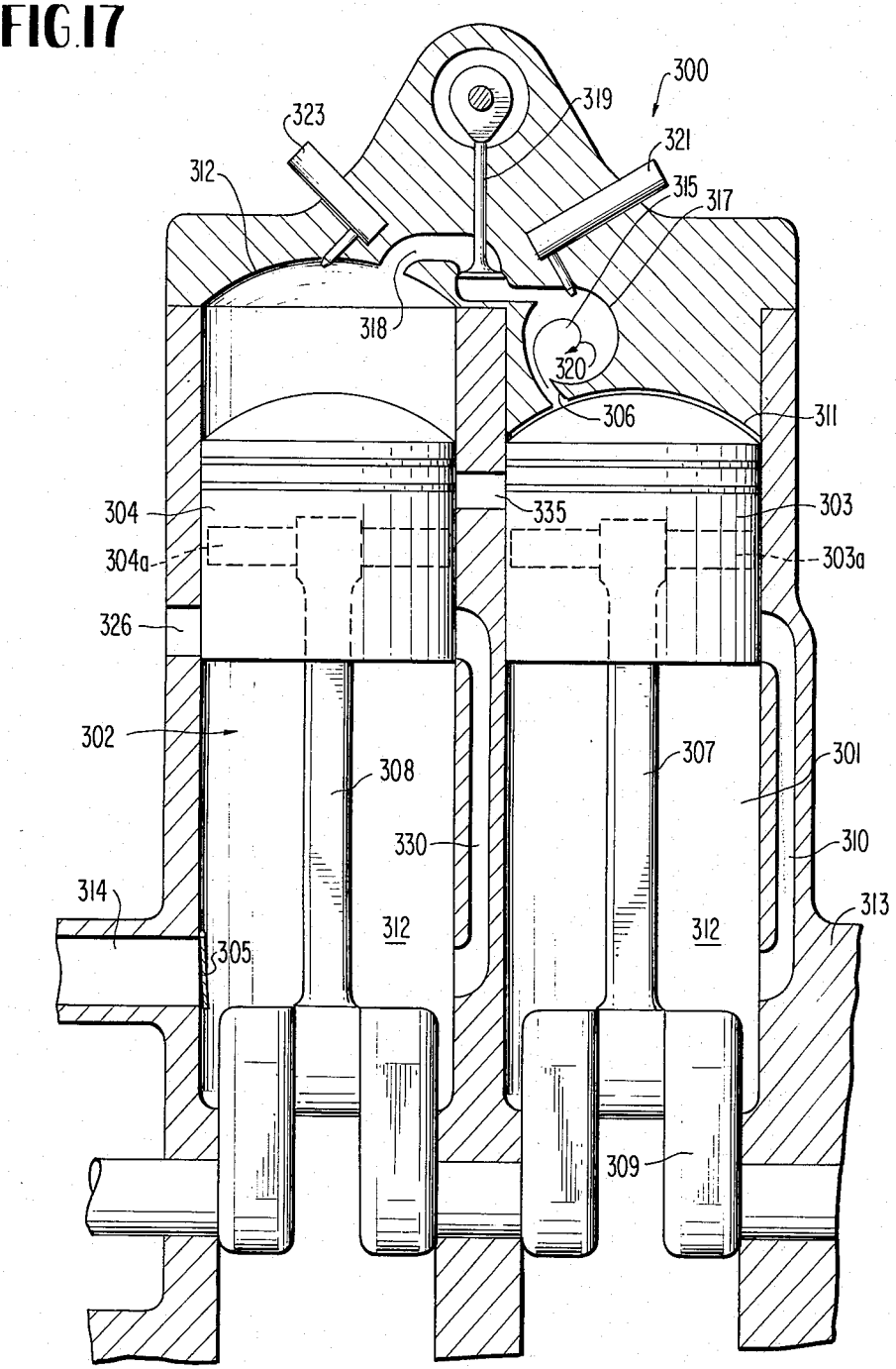
Figure 18:
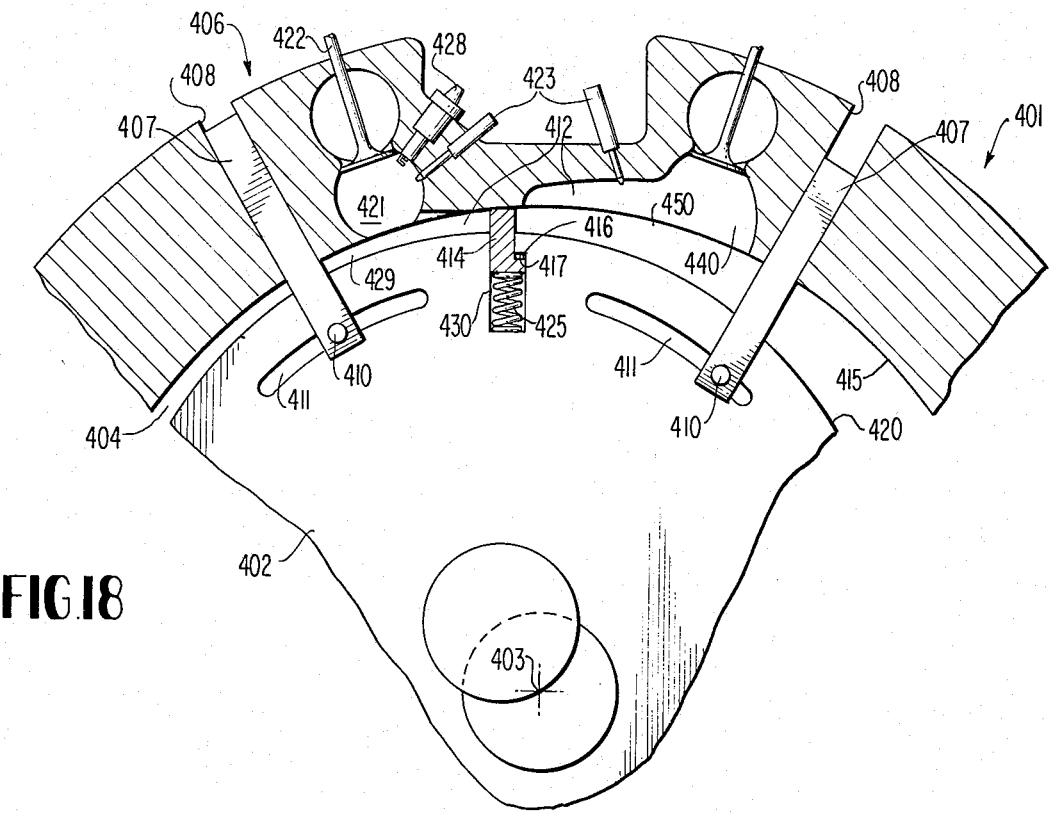
Figure 19:
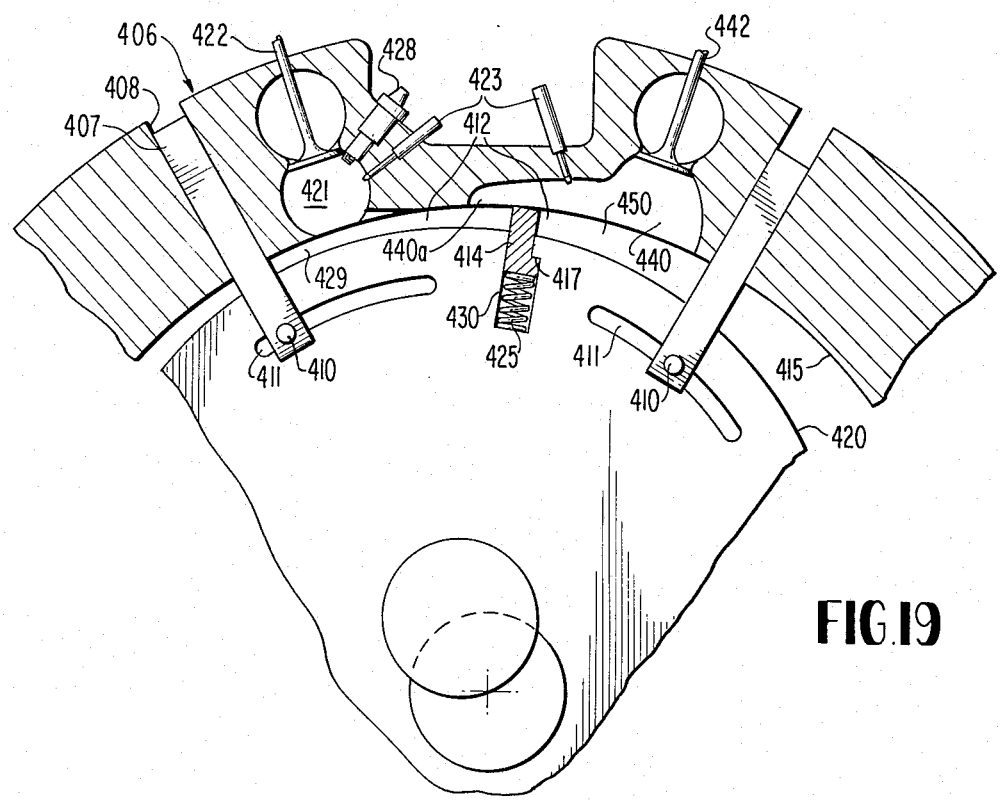
Figure 20:
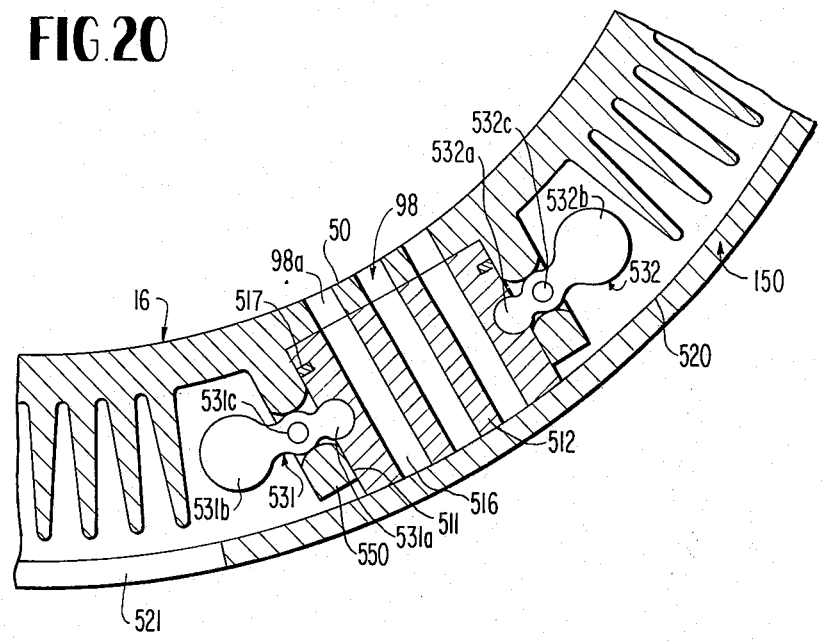
Figure 21:
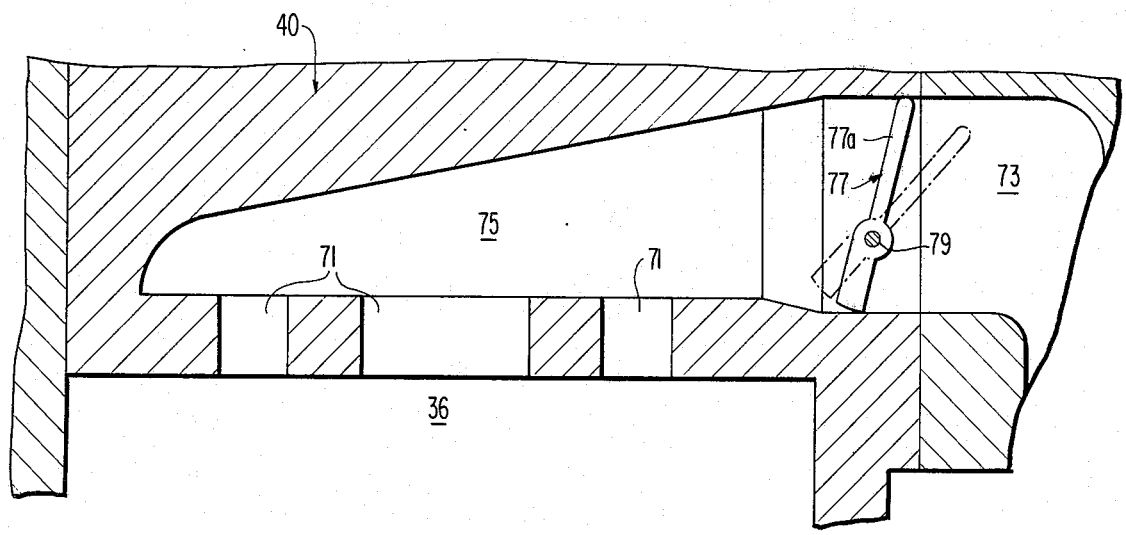

FIGS. 5 to 16 inclusive are diagrams illustrating the combustion cycle of the engine of FIG. 1;

FIG. 17 is a partly diagrammatic longitudinal cross-section of a reciprocating internal combustion engine modified to operate on a combustion cycle analogous to that of the engine of FIG. 1;

FIGS. 18 and 19 are partly diagrammatic fragmentary transverse cross-sectional views illustrating the mode of operation of an orbital piston engine modified to operate on a combustion cycle analogous to that of the engine of FIG. 1;

FIG. 20 is a partly diagrammatic fragmentary cross-section illustrating a modification of the engine of FIG. 1; and FIG. 21 is a fragmentary longitudinal cross-section showing an exhaust valve incorporated in a compressor section of the engine of FIGS. 1 and 2.

DETAILED DESCRIPTION

The internal combustion engine 12 shown in FIGS. 1 and 2 include an outer hollow cylindrical casing 150 which contains an inner stationary member 14 and an outer housing 16, housing 16 being rotatable around member 14. Member 14 is of elongate cylindrical configuration being made up of a plurality of axially abutting sections which are clamped together by bolts (not shown). Housing 16 is likewise made up of a plurality of axially abutting sections and is of generally cylindrical hollow configuration, being supported on member 14 for rotation therearound by a plurality of rollers or ball bearings 20.

The inner member and housing 16 together co-operate to define a combustion section 21, a compressor section 23 and a fan section 25 of the engine. The combustion section 21 includes a curved wall section 18 of housing 16 which extends around one end section 22 of member 14 to define a chamber 26 between these. Chamber 26 is closed at one end by a transverse wall portion 28 of housing 16. Portion 28 slidingly and sealingly engages a transverse end surface 30 of chamber 14. The other end of the chamber is sealed by an inwardly extending wall portion 32 on housing 16. Wall portion 32 slidingly and sealingly engages an inwardly stepped surface portion 34 on member 14.

The compressor section of the engine includes a second chamber 36 which is defined between an intermediate section 38 of member 14 and an intermediate curved wall section 40 on housing 16. Chamber 36 is closed at one end by engagement between wall portion 32 and an inwardly extending sealing surface 42 on member 14, and at the other end by engagement between an inwardly extending transverse wall portion 44 on housing 16 and an inwardly stepped sealing surface 46 on member 14.

Chambers 26 and 36 are of generally similar configuration and the configuration of chamber 26 only is described in detail with particular reference to FIG. 2. Chamber 26 is bounded at the outside thereof by an internal surface 50 of curved wall section 18. Surface 50 has a first portion 50a which is of constant curvature measured from the longitudinal axis 51 of member 14. Portion 50a extends for a peripheral distance W (FIG. 2) about axis 51. A diametrically opposed second portion 50b of surface 50 is also of constant curvature about axis 51 but is of lesser radius than that of portion 50a. Second portion 50b extends for a peripheral distance Z. The angle $\phi$ subtended between lines joining the extreme end points of surface portion 50a to axis 51 is equal to the angle $\phi$ subtended by lines joining the ends of surface portion 50b to axis 51. The adjacent ends of surface portions 50a and 50b are interconnected by opposed surface portions 50c and 50d of graduated curvature between the curvature of the surface portion 50a and that of the surface portion 50b. These portions may, for example, be arranged to give, over a majority intermediate portion of their length a constant alteration in curvature between the two curvatures of portions 50a and 50b.

The configuration of surface portions 50c and 50d is such that lines passing from side to side of surface 50 and normally through axis 51 are of constant length at all angular positions of such lines about axis 51.

The innermost surface of chamber 26 is defined by the outer cylindrical surface 82 of section 22 of member 14. Surface 82 is of radius only sufficiently less than that of surface portion 50b to secure a good running clearance between the two surfaces. It will be seen that chamber 26 is of somewhat crescent-shaped configuration when viewed in transverse section. The mounting of housing 16 relative to member 14 is such that during rotation of the housing about member 14, a constant small clearance is maintained between surface 82 and surface portion 50b and chamber 26 remains of constant configuration but moves around the periphery of member 14.

Although, as mentioned previously, the configuration of chamber 36 is identical to that of chamber 26, these chambers are disposed in opposed relationship. That is to say, the portion of greatest constant curvature of surface 50, i.e. surface portion 50a, is diametrically opposed to the corresponding portion of greatest curvature of the interior surface 53 of curved wall section 40, which surface 53 defines the outer periphery of chamber 36.

Member 14 has two diametrically extending vanes 52, 54 which are slidable therein, being retained in respective parallel, but axially spaced, diametral slots 57, 59 in member 14. Vane 52 is positioned within chamber 26 and vane 54 is positioned within chamber 36. Front and rear surfaces 52a, 52b, 54a, 54b of vanes 52, 54 slidingly seal against transverse bounding surfaces of chambers 26, 36 defined on transverse wall portions 28, 32 and 44. The vanes are each provided, at outer longitudinal edges thereof, with longitudinal extending engaging elements 61 (FIG. 2). Elements 61 are retained in longitudinal end cavities 63 in the vanes. Cavities 63 are of concave arcuate transverse section and elements 61 have complementary convex arcuate surfaces 65 which engage surfaces 63.

Outer longitudinal surfaces 67 of elements 61 are of convex arcuate configuration of radius substantially equal to the radius of the smaller radius portion of peripheral surfaces 50, 53, (i.e. of the same radius as surface portion 50b in FIG. 2).

The side-to-side distance of vanes 52, 54, measured through axis 51, is substantially equal to the constant side-to-side dimension of surfaces 50, 53. Thus, surfaces 67 of vanes 52, 54 substantially constantly engage and seal with surfaces 50, 53 during rotation of housing 16. Because of the co-operating arcuate surfaces 63, 65 on the vanes and elements 61, the elements can rotate about longitudinal axes during such rotation to more closely accommodate the surfaces 67 to the configuration of those parts of the surface 50 or 53 with which they are in engagement. This ensures a good area of substantial contact between surfaces 50, 53 and surfaces 67 which facilitates sealing and minimises wear of the surfaces. It will be observed from FIG. 2, for example, that, because of the configuration of surfaces 50, 53, these surfaces cause to and fro reciprocation of vanes 52, 54 in slots 57, 59 during rotation of housing 16 by virtue of camming action against surfaces 67. This reciprocation consists of in and out movements of the vanes through member 14 which occur only when surfaces 67 engage surface portions 50c, 50d and the corresponding portion of surface 53. No movement occurs when surfaces 67 engage surface portions 50a, 50b and the corresponding portions of surface 53 because of the constant radii of these portions. Because of the relatively opposed dispositions of chambers 26, 36 caused by corresponding opposite dispositions of corresponding portions of surfaces 50, 53 the reciprocating movement at any time of vanes 52, 54 are opposed so that good balancing of moving parts of the engine is obtained. The relatively constant rates of change of curvature over the major parts of surface portions 50c, 50d and corresponding major parts of portion of surface 53 also ensures that movement occurs mainly at constant velocity thus avoiding heavy acceleration loads on the vane during reciprocation. This can be enhanced by arranging for smooth transitions between the portions of varying curvature and the constantly curved portions of surfaces 50, 53. Again, heavy accelerative loading effects could be further minimised by so shaping surfaces 50 and 53 as to cause movement of vanes 52, 54 to approximate simple harmonic motion.

Chambers 26, 36 are divided by vanes 52, 54 to form chamber sections of varying volume during rotation of housing 16 and these changing volumes are utilized, in a manner described hereinafter, to provide, in chamber 36, compression of air, and in chamber 26, suitable conditions for operation of the combustion cycle of the engine. The compressor section 23 and its manner of operation is now described in detail after which the combustion section 21 and the combustion cycle of the engine are described.

Figure 3A:
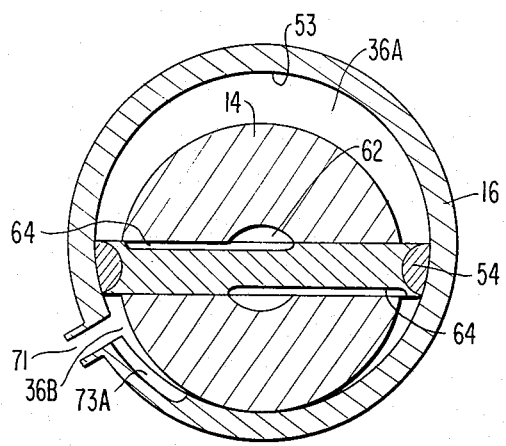
FIGS. 3A to 3D are diagrams illustrating the manner of operation of a compressor forming part of the engine of FIGS. 1 and 2.
Figure 3B:
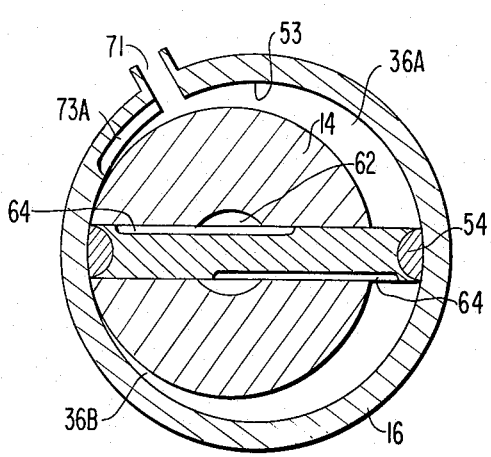
Figure 3C:
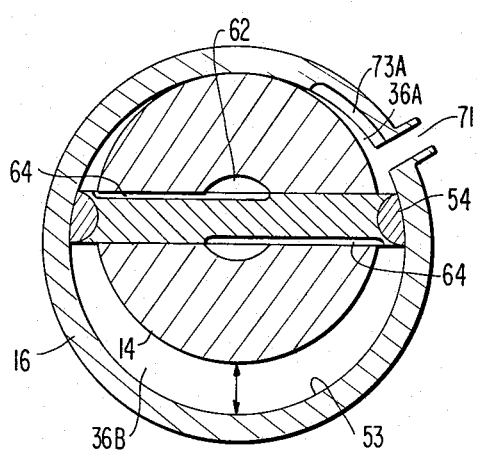
Figure 3D:
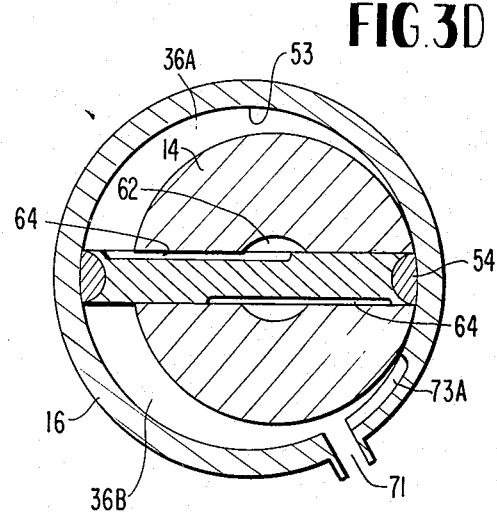

Compressor section 23 is provided with an inlet duct 60 which extends axially through member 14 from the end thereof remote from vane 52. This leads to a central cylindrical gallery 62 in intermediate section 38 of member 14. As rotation of casing 16 occurs during use of the engine, air is introduced into chamber 36 from gallery 62 via two pairs of slots 64 on vane 54 and compression of the air takes place within the chamber. One pair of slots 64 extends on one major face of vane 54 from an intermediate location radially outwardly of member 14 terminating at a location spaced inwardly from one outer surface of the vane. The other pair extend outwardly from the intermediate location on the opposite major face of the vane and oppositely radially outwardly to terminate at locations spaced inwardly from the other outer surface of the vane. Compression in chamber 36 is effected by action of vane 54 which divides chamber 36 into two sections 36A, 36B as shown in FIGS. 3A to 3D inclusive and which upon reciprocation thereof due to rotation of housing 16 acts in conjunction with slots 64 to control inlet of air to the chamber sections. Chambers 36A, 36B undergo cyclic variation in volume during rotation of housing 16. FIG. 3A shows a rotational position of housing 16 at which the volume of the chamber 36A is at a maximum and the volume of chamber 36B is at a minimum. This corresponds to a position in which the opposite ends of vane 54 engage surface 53 at such locations that vane 54 projects an equal distance from each side of member 14. It will be seen that the disposition of slots 64 on the vane is such that they communicate with gallery 62 and with chamber sections 36A, 36B. At this stage, vane 54 is moving from left to right as viewed in FIGS. 3A to 3D so that the slots communicating with chamber section 36A are just about to close whereas those communicating with chamber section 36B have just opened. As rotation continues, then, vane 54 is moved in member 14 further to the right as viewed in FIGS. 3A to 3D thus closing chamber section 36A from communication with its associated slots 64 whilst maintaining full communication between chamber section 36B and its associated slots 64. Thus, air from gallery section 62 can enter chamber section 36B and air is so drawn into chamber section 36B from gallery 62 by virtue of the partial vacuum created by the increase in volume of chamber section 36B occurring during this rotation (FIG. 3B). At the same time it will be seen that chamber section 36A is decreasing in volume and air therein is thus compressed and leaves this chamber section via an exhaust port 71 in the wall of housing 16. Upon further continuance of rotation the drawing of air into chamber section 36B continues whilst compression and exhaust of air in chamber section 36A continues until the condition of FIG. 3C is reached at which chamber section 36A is again at minimum volume and chamber section 36B is at maximum volume. Here, chamber section 36A is again in communication with gallery 62 via slots 64. Further rotational movement then serves to decrease the volume of chamber section 36B whilst closing communication of the chamber section with gallery 62 via slots 64 and compression of air in chamber section 36B is thus effected by the decreasing volume of this chamber section and compressed air is exhausted from the chamber section via exhaust port 71, now positioned to communicate with chamber section 36B. This condition is shown in FIG. 3D and further rotational movement of the housing again brings the compressor section to the condition shown in FIG. 3A, with compression and exhaust in chamber 36B concluded and with exhaust port 71 about to be brought into communication with chamber section 36A. It will thus be seen that upon each rotation of housing 16, both chamber sections 36A and 36B deliver a compressed air charge out of exhaust port 71. In order to facilitate exhaust of as much air as possible from each chamber section a slot 73A is cut into surface 53 adjacent port 71.

Exhaust port 71 communicates with an adjacent exhaust gallery 75 (FIG. 21) extending along and within wall section 40 and this in turn communicates with an annular chamber 73 in housing 16 at the side thereof remote from combustion section 21 of the engine. As explained hereinafter this part of the engine is relatively cool and thus serves to cool air exhausted from port 71.

Communication between the exhaust gallery and chamber 73 is via a valve which operates to prevent back flow of air from chamber 73 into the exhaust gallery and thus back into chamber 36. This valve might comprise a reed valve but in the engine illustrated is constructed as shown in FIG. 21. This comprises a butterfly valve 77 pivoted about a pivot pin 79 having its axis lying in a plane normal to axis 51. The axis of pin 79 is also tangential to an imaginary circle around axis 51. The valve is eccentrically pivoted having an arm 77a of greater length disposed outwardly of pin 79. Because of this, centripetal forces acting on the valve during rotation of housing 16 tend to maintain the valve closed when air pressure in chamber 36 is equal to that in chamber 73, but the valve will open to allow air flow into chamber 73 when the pressure in chamber 36 and gallery 75 reaches a value in excess of that in chamber 73.

Chamber 73 is in direct communication with an annular induction gallery 66 for combustion section 21. Gallery 66 is formed in wall section 28 and communicates with chamber 73 by means of a longitudinal heat insulated duct (not shown) which extends through housing 16 at a location approximately diametrically opposite exhaust gallery 75.

Combustion section 21 of the engine is formed around section 22 of member 14. Each section 22 is provided with four cavities 68, 70, 72, 74 (FIG. 2), two of these cavities 68, 70, being disposed to one side of vane 52 and the other two, cavities 72, 74, being disposed to the other side thereof. Cavities 68, 74 are diametrically opposed and open from end surface 30 on end section 22 into the peripheral surface 82 of end portion 22. Thus, each cavity 68, 74 communicates with a separate port A in surface 30 these ports being at diametrically opposed locations on face 30 and at equal distances from axis 51. Ports A lead to generally cylindrical longitudinally inwardly extending cavity sections B and then to outwardly extending cavity extensions C which break into surface 82 at ports D.

Cavities 70 and 72 are likewise diametrically opposed and equi-spaced from axis 51 but on a greater pitch circle than cavities 68 and 74. Cavities 70 and 72 each have a generally cylindrical cavity section G which extends longitudinally inwardly from a port H on surface 30 and a communicating cavity section J which extends inwardly from a relatively narrow port K on peripheral surface 82. Section J is of generally ovaloid configuration in section transverse to axis 51 having smooth curved surfaces which merge with the surface of passage section G.

Each cavity 70, 72 is provided with a spark plug L. Each spark plug L is screwed into a separate threaded opening 94 which constitutes an extension of the adjacent chamber section G to the side thereof remote from port H. The spark plugs thus open into the remote end walls of cavity sections G. The spark plugs are retained in end portions of tubes 95 which extend away from openings 94 longitudinally through tubular bores in member 14 and externally of member 14. The chambers 68, 70, 72, 74 also each have fuel injector elements 104 which are likewise disposed at inner ends of tubes 102 which extend into longitudinal tubular bores in member 14 in the same way as do the tubes 95.

An exhaust port 98 is provided in curved wall section 18 at a location approximately 100° clockwise from one end of surface portion 50b, as viewed in FIG. 2. A small cut-out 96 is formed in surface 50 of casing 16 at locations generally diametrically opposed to the location of exhaust port 98.

Induction gallery 66 is open to a plurality of inlet ports 106, 108, 110 which pass through wall section 28. Ports 106, 108 are disposed a distance from axis 51 equal to the distance from axis 51 of ports H associated with cavities 70, 72 whilst port 110 is located at a distance equal to the distance of ports 68, 74 from axis 51. Thus, during rotation of housing 16 compressed air in induction gallery 66 will be transferred into cavities 68–74 at times when registration between ports 106, 108, 110 occurs with the ports associated with these cavities.

Chamber 26 is divided by vane 52 into two sealed chamber sections 26A-26B in the same manner as the space 36 is divided by vane 54. These chamber sections are further divided, at certain times during operation of the apparatus, by two seals 120, 122 which are disposed on the periphery of member 14 at diametrically opposed locations and 90° away from the median plane of vane 52. Seal 120 is disposed between ports D and K of cavities 72, 74 and seal 122 is disposed between ports D and K of cavities 68, 70. Seals 120, 122 extend along the length of surface 82 and are movable radially of axis 51. Normally they are biased (by spring means not shown) to a position at which outer edges 120a, 122a project slightly from surface 82 but they can be pressed inwardly against this bias, such inward pressing occurring when, during rotation of housing 16, the motion of surface 50 is such as to cause the seal to be engaged by surface 50.

Figure 4:
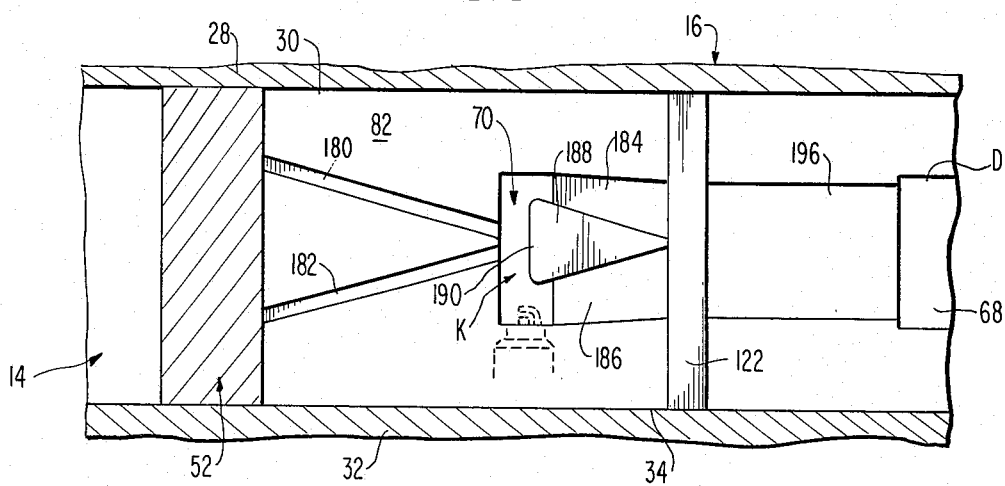
FIG. 4 is a fragmentary side view of part of the peripheral surface of an inner member of the engine of FIG. 1.

The pair of cavities 68, 70 and the pair of cavities 72, 74 each have associated therewith a separate plurality of grooves. The grooves are identical for each pair and only one set of grooves, that associated with cavities 68 and 70, is described in detail with reference to FIG. 4. The grooves shown therein include two grooves 180, 182 which begin at a portion of surface 82 adjacent vane 52 and at locations equi-spaced from the faces 30, 34 of member 14. These grooves then converge towards cavity 70 breaking into port K of the cavity at closely spaced locations. Port K is generally rectangular in configuration, spaced from either side face 30, 34. Two further grooves 184, 186 are also cut into surface 82 these extending from port K to seal 122. These grooves are spaced one to either side of a wedge shaped land 188 formed by surface 82 and which separates grooves 184, 186 so that land 188 defines, at its widest end, a tongue 190 which is undercut by the cavity section J of cavity 70. Because of the wedge-shaped configuration of land 188 the grooves 184, 186, which have straight outer sides generally parallel to the surfaces 30, 34, increase in width in directions towards seal 122.

A further groove 196 is provided in surface 82 this leading away from seal 122 to break into port D of cavity 68. The groove is relatively wide but has side edges spaced from the adjacent side surfaces 30, 34 and constituting continuations of the outer edges of grooves 184, 186.

Figure 5:
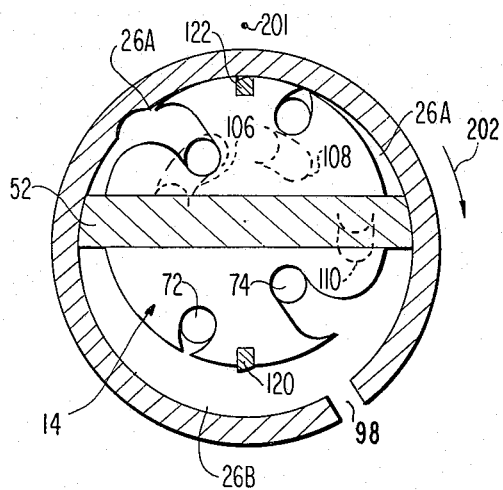
Figure 6:
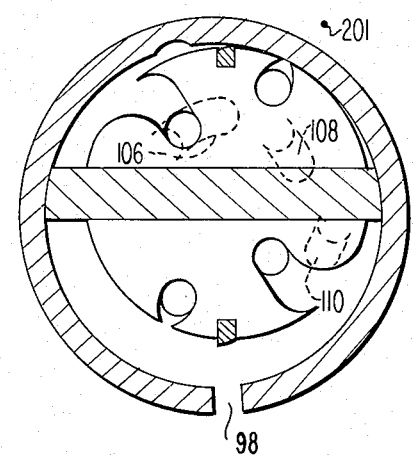
Figure 7:
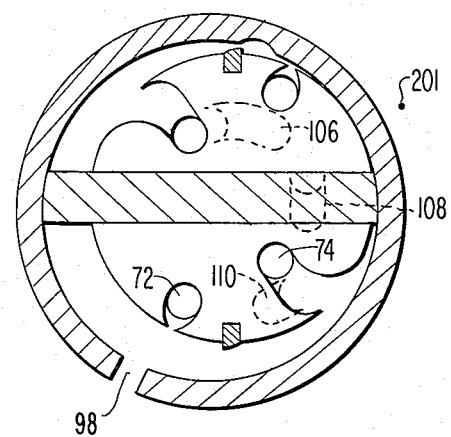
Figure 8:
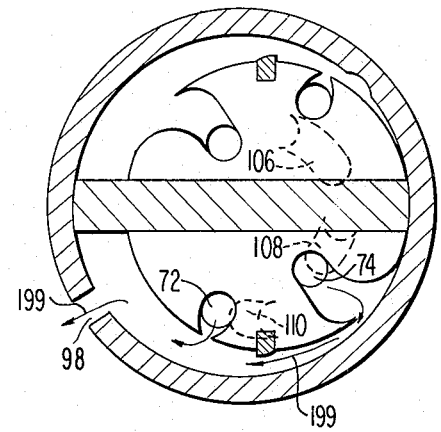
Figure 9:
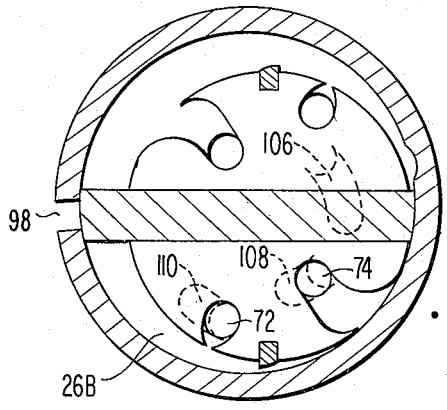

The operation of combustion section 21 is now described with reference to FIGS. 5 to 16 which show housing 16 at twelve successive equi-spaced positions during one revolution thereof. FIG. 5 shows a stage, during rotation of housing 16, at which a mid-point (indicated by dot 201) along the length of surface portion 50b is adjacent seal 122. At this stage, chamber section 26B is at its maximum volume and chamber section 26A is at its minimum volume. Since, during each revolution, a complete cycle of events takes place in both chamber sections 26A, 26B and these cycles are identical except that the cycle in chamber section 26A is displaced in time by one half-period from that taking place in chamber section 26B, only the cycle of events taking place in chamber section 26B is described. In FIGS. 5, 6 and 7 burnt gases from a previous cycle are present in chamber section 26B. Housing 16 is revolving in the direction indicated by arrow 202 and it will be seen that exhaust port 98 is open to chamber section 26B so that exhaust gases in chamber section 26B can flow therefrom through the exhaust port. Sweeping of exhaust gases is facilitated, during subsequent rotation of housing 16 (FIG. 6), by the decreasing volume of chamber 26B. After about 90° of rotation (FIG. 8) exhaust port 98 is still in communication with chamber section 26B and a considerable quantity of exhaust gas has been expelled. Ejection of the remainder is now facilitated by air supplied from induction gallery 66 which flows through ports 108, 110 which, at this stage, come into communication with ports A and H of cavities 72 and 74. This causes air to pass through the chamber section 26B as indicated by arrows 199 so that good scavenging is achieved. If this admission of air did not occur, there would be a tendency for exhaust gases to remain in chamber section 26B particularly adjacent cavity 74. Scavenging continues (FIG. 9) until exhaust port 98 no longer communicates with chamber section 26B by virtue of further rotation of housing 16 whilst chamber section 26B continues to decrease in volume. At this stage, substantially all of the exhaust gases have been removed from chamber section 26B and the continuing rotation of the housing initiates charging of chamber section 26B with air which is still being delivered from ports 108, 110 through cavities 72, 74.

Figure 10:
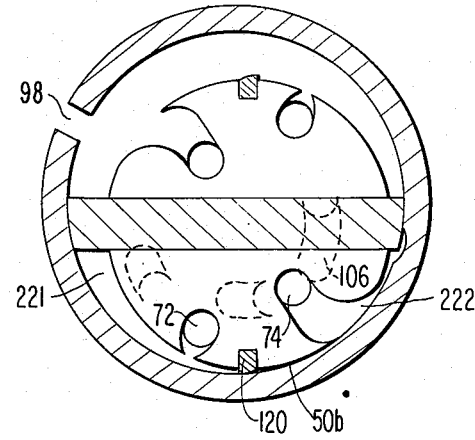
Figure 11:
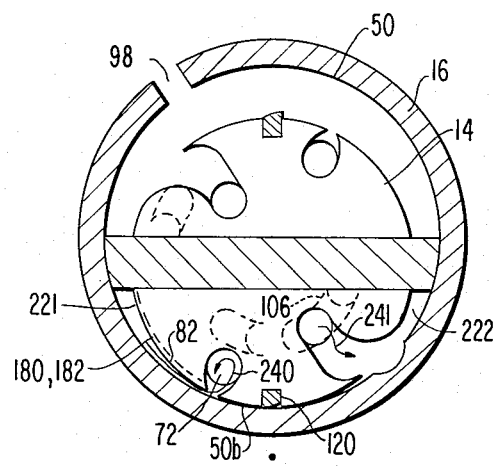
Figure 12:
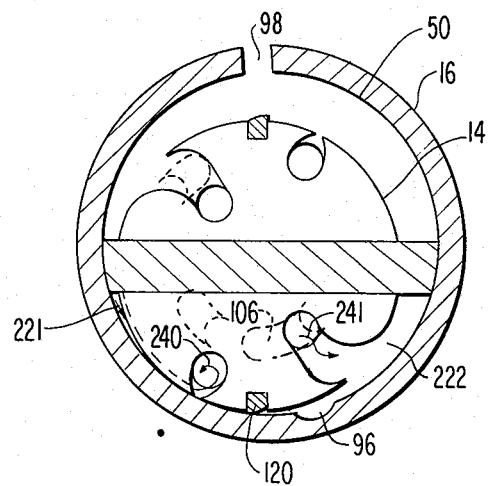

As housing 16 begins to approach 180° rotation from the position shown in FIG. 5 (i.e., as shown in FIG. 10) air is no longer supplied via cavity 72 because port 110 has passed this cavity but continues to be supplied into cavity 74 from port 106 which now comes into communication with cavity 74. At this stage also, seal 120 comes into contact with surface portion 50b of surface 50 thereby sealing chamber section 26B into two parts 221, 222 of which part 221 is open to cavity 72 whilst part 222 is open to cavity 74. Chamber part 222 is then decreasing in volume as is chamber part 221, however air is still supplied into chamber part 222 by virtue of the greater pressure of air in gallery 66. Continuation of rotation causes the closed chamber part 221 to decrease to a very small volume (FIG. 11) and also causes parts of the peripheral surface 82 adjacent port K of cavity 72 to come into closely spaced complementary disposition relative to portion 50b of surface 50. Pressurized air in chamber part 221 is forced to flow through grooves 180, 182 into cavity 72, since the pressure of air in chamber part 221 is then raised to a very high level compared with that in cavity 72 and the grooves provide the only substantial communicating path between chamber part 221 and cavity 72. No air flow occurs through grooves 184, 186 into chamber portion 222 because of the sealing provided by seal 120 against surface 50. It will be seen that, as rotation of housing 16 continues (FIGS. 11 and 12), cavity 72 is closed to communication with any of the ports 106, 108, 110 and that the air forced into cavity 72 through grooves 180, 182 is directed thereinto with considerable force owing to the substantial rate of decrease of volume in chamber portion 221 and the narrowness of the grooves 180, 182. Air thus entering cavity 72 is directed across port K and strikes the interior surface of cavity section J of the cavity 72. Cavity section J is so shaped as to cause a circulatory motion of air thus entering the chamber, this motion being indicated diagrammatically by arrow 240 in FIGS. 11 and 12. Because of the convergent nature of grooves 180, 182, there is also a tendency for air entering the cavity 72 to move in directions along the longitudinal length of the cavity. The combined lengthwise and circulatory motions thus generate a somewhat helical air movement within the cavity with the result that there is a considerable degree of turbulence created within the cavity. Fuel injection through injector 104 is effected into cavity 72 at about this time and shortly thereafter ignition of the thus created air fuel charge is effected by actuating the spark plug L associated with cavity 72. This ignition does not generate any substantial force tending to drive casing 16 in the direction of rotation of the engine because the cavity is closed at port K by the overlying surface portion 50b. Forces generated by ignition thus act principally in a radial direction.

Figure 13:
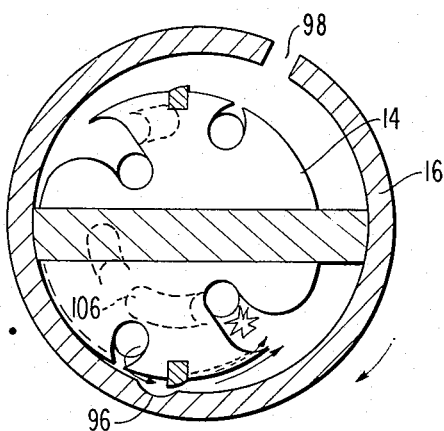
Figure 14:
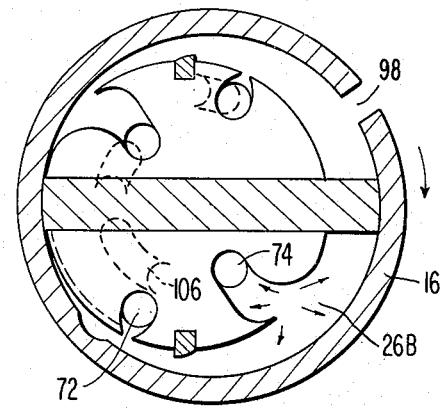
Figure 15:
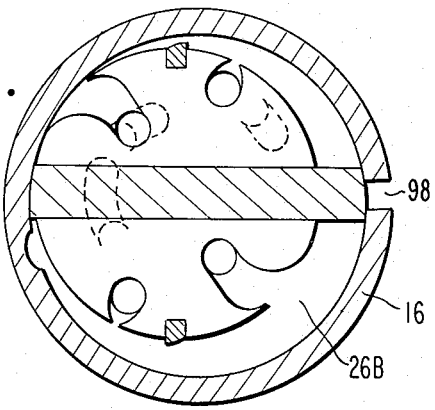
Figure 16:
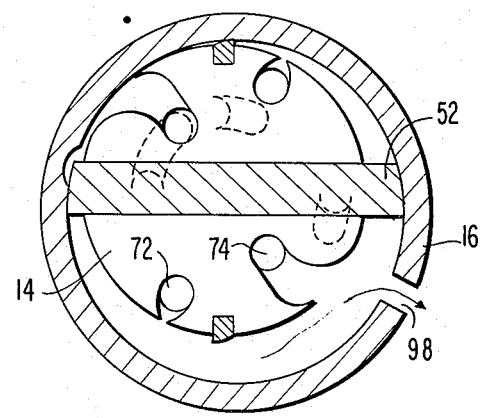

Shortly after ignition takes place in cavity 72, the futher rotation of casing 16 causes seal 120 to lose contact with surface 50 (FIG. 13) this occurring rapidly as the seal encounters cut-out portion 96 in the surface. Hot gases generated in cavity 72 are thus able to leave the cavity via passages 184, 186, passing over seal 120 and also along passage 196, into chamber part 222. At this point, chamber part 221 is reaching zero volume so that there is no tendency for escaping gases to move in the opposite direction along grooves 180, 182. Previous to this ejection of burning gases from cavity 72, chamber part 222 has been receiving compressed air from port 106 as indicated by arrow 241 in FIGS. 11 and 12. A considerable inflow of compressed air into chamber part 222 has thus occurred by virtue of the relatively long length of port 106 which remains in communication with the cavity 74 for some time thus permitting a relatively high degree of compression of air in chamber part 222 even though there is some expansion thereof during this period. Shortly before transfer of heated gases occurs between chamber parts 221 and 222 port 106 passes from communication with cavity 74 and injection of fuel into the compressed air in chamber part 222 occurs. This is shortly before the condition of FIG. 13 is reached. Thus, the turbulent heated gases which are passed into chamber part 222 through grooves 184, 186 and past seal 120 cause immediate combustion of the air fuel mixture in chamber part 222. Combustion causes generation of heated gases which rotationally drive housing 16. Continuance of rotation (FIGS. 14, 15 and 16) causes chamber section 26B (which is no longer divided by seal 120) to again increase in volume thus allowing expansion of gases therein until the condition of FIG. 16 is reached when exhaust port 98 is once more in communication with chamber section 26B and exhaust of gases expanded in the chamber section begins and the cycle of operation is complete.

Ignition of the fuel charge in cavity 74 is facilitated by injection of fuel from the fuel injector associated therewith onto a tongue 83 formed in cavity 74 adjacent port D and which remains relatively hot during operation of the engine because of its small dimension and proximity to the position where ignition is taking place. The reciprocating movement of vane 52 which occurs during operation of the engine is so arranged that, as movement ceases during times when the ends of the vane engage portions 50a, 50b of surface 50 which are of constant radius the vane is subjected to maximum pressure of expanding fluid. Thus, there is no reciprocating movement of the vane during times when it is under greatest stress from expanding gases; during the whole of the expansion phase the blade end which is subjected to the gas pressure is moving about the larger radius portion 50a of the surface and during the critical ignition stages it is moving about the constant radius portion 50b. The construction of the engine is also such as to permit the thickness "T" (FIG. 2) of vanes 52, 54 to be made substantial thereby enabling a strong vane construction to be achieved. In this respect, increasing the thickness of the vanes, if necessary for increasing strength further, can readily be effected without affecting the engine timing.

The good efficiency of combustion which results from the manner of ignition which is utilized ensures a minimum generation of pollutant gases. Particularly, hydrocarbon emission from the exhaust of an internal combustion engine is principally due to the presence of unburnt fuel. In the engine of the present invention, good and complete combustion can be achieved by virtue of the substantial hot gas front which is created by the injection of hot gases into the chamber part 222 and minimum hydrocarbon generation results. Generation of other pollutants such as nitrous oxides will occur in an internal combustion engine under conditions where combustion is effected at extreme pressures or temperatures. It is possible to arrange an engine like that shown in FIGS. 1 and 2 so that high peak pressures in the chamber parts is avoided. In this respect, it will be appreciated that in a reciprocating internal combustion engine there is a very high pressure peak created at the moment of ignition because ignition takes place in a very small space. Furthermore, since ignition in such engines is normally a practically instantaneous process the normal means for increasing engine performance is to increase this momentary high pressure high temperature ignition condition to give a higher generated pressure. increasing performance in this way will thus have the effect of worsening the conditions insofar as generation of nitrous oxides is concerned. If the engine of FIGS. 1 and 2 is arranged so that injection of fuel into cavities 74 and 68 occurs during substantially the whole of the expansion stages in their associated chamber sections 26B, 26A it is possible to secure increased performance without necessarily increasing the peak pressure generation in chamber sections 26A, 26B as combustion in this case will be a relatively prolonged operation. Again, in such an arrangement the engine could be arranged to operate with a relatively low peak pressure but which, because it is sustained for a relatively longer period than can occur in a reciprocating internal combustion engine can nevertheless produce an equal or greater driving force. This could be effected, for example, by enlarging the cavities 68–74. It is possible by this means to arrange for greater power extraction whilst working at much lower pressures than is the case in reciprocating internal combustion engines. Thus, generation of nitrous oxide pollutants can be minimised without suffering comparatively from reduced performance.

The fan section 25 of the engine includes, on the end of housing 16 remote from gallery 66, a number of planetary gears 126 which are freely rotatable about axles 126a which project from a transverse face of the housing and parallel to axis 51 on a common pitch circle. These engage a sun gear 128 on member 14 and also an outer ring gear 130 freely rotatable about member 14. Ring gear 130 carries a set of freely rotatable planetary gears 132 which are freely rotatable upon axles 132a projecting from ring gear 130 and extending generally parallel to the axis 51 on a common pitch circle. These gears engage sun gear 128 and also a second ring gear 134 which is carried by a fan assembly 140 freely rotatable about member 14, this being carried upon a roller bearing 142. The gears 126, 130, 132, 134 comprise a planetary drive mechanism which operates to drive fan assembly 140 rotationally about axis 51 at a rate which is greater than the rate of turning of housing 16 about axis 51.

Fan assembly 140 comprises a body 144 of annular configuration and which carries bearing 142 and a plurality of vanes 146 spaced outwardly of and around body 144. These serve to draw air from the right-hand side of fan assembly 140 as viewed in FIG. 1 through the vanes to the left-hand side of the fan assembly. An outer cylindrical element 147 extends around the outer periphery of the fan assembly being affixed to outer edges of the vanes 146 and running in close proximity to the inner surface of casing 150. An inner annular end section 154 of casing 150 has a plurality of air openings 156 therethrough and these are arranged so that, when fan assembly 140 is turned, air enters openings 156 and is passed by the fan through a generally annular passageway 158 in housing 16 and from right to left as viewed in FIG. 1 so as to pass in succession over the outer parts of wall sections 40 and 18 to leave the engine via a cooling air outlet 160 towards the left-hand end of casing 150 and formed in the casing. This air serves to cool the engine during operation and housing 16 is provided with fins 16A (FIG. 2) to facilitate this.

Casing 150 is also provided with a duct 176 which opens partly around the periphery thereof at a location to receive exhaust gases emitted, in use of the engine, from exhaust port 98. This duct is so disposed such that air moving along passageway 158 will sweep the exhaust gases therethrough.

The end of casing 150 surrounding combustion section 21 is supported upon a roller bearing 170 which is arranged within an annular bearing support 172 forming part of the casing. Bearing 170 is located around an outwardly extending cylindrical portion 174 on housing 16. Annular bearing support 172 is interconnected with the remainder of casing 150 by means of an annular resilient rubber element 180. At the end of casing 150 around fan section 25 casing 150 is secured to member 14 by means of a plurality of resilient rubber blocks 152 which are spaced about the periphery of member 14 and are connected to inner annular end section 154 of casing 150. Element 180 and blocks 152 operate to absorb the torque reaction generated upon combustion of each second working fluid charge; the vane 52 acts, in this respect, as a reaction abutment for pressure force generation and the absorption of such reaction is desirable. The resultant mounting is arranged such that energy absorbed in element 180 and blocks 152 during take up of such reaction torque is subsequently returned as combustion pressure reduces. The element 180 and blocks 152 also provide insulation against transmission of engine vibration to casing 150.

A split combustion cycle of the type utilised in the engine of FIGS. 1 and 2 may be utilised in other types of engine. For example, FIG. 17 shows a reciprocating internal combustion engine 300. It is provided with two cylinders 301, 302 within which run separate reciprocable pistons 303, 304. Pistons 303, 304 are connected by gudgeon pins 303a, 304a connecting rods 307, 308 to a crank shaft 309. Cylinder 301 has a lowered roof section 311 arranged such that at the top of the stroke of piston 303, the piston is displaced a very small distance from the roof so that there is a very small volume in the cylinder between roof 311 and the top of the piston. On the other hand, the roof 312 of cylinder 302 is considerably higher than roof 311 so that at the top of its stroke piston 304 is spaced considerably below the roof to give a substantial working volume between roof 312 and the top of piston 304.

Engine 300 is of the two stroke kind, having transfer ports 310, 330 leading from the interior 312 of the engine crank-case 313 to the upper parts of cylinders 301, 302. Air inlet ports to the crank-case are provided, one of these being shown by reference numerals 314. These are provided with valves 305 which enable inflow of air when there is a reduced pressure inside crank-case 313, as compared with the pressure external to the engine but which prevent outflow from the crank-case when there is increased pressure in the crank-case. The transfer ports 310, 311 are arranged such that air, after having been admitted through ports 314 and valves 305 into crank-case 313 during upward movement of pistons 303, 304, is transferred, during a subsequent downward movement of the pistons through the transfer ports and into the cylinder spaces above the pistons 303, 304. As the piston subsequently rises in cylinder 301, the transfer ports are closed by the pistons and air above the piston is compressed therein and is forced into a chamber 315 above cylinder 301 which is connected to the cylinder via a restricted passageway 306 somewhat tangential to a generally cylindrical side surface 317 of the chamber 315. The chamber leads, via a passageway 318, to cylinder 302, opening into roof 312. The compressed gas in chamber 315 cannot escape, at first, because passageway 318 is closed by a valve 319 which is cam operated from crank shaft 309. Thus, considerable compression of air takes place in chamber 315 and the air therein is forced into turbulent motion generally in a circular pattern as indicated by the arrow 320. As turbulent air is moving within this chamber, fuel is injected into the chamber via a fuel injector 321, ignition of this air fuel mixture so created being then effected by a spark plug (not shown) or by other means such as a glow plug or by compression ignition. Valve 319 then opens under action of a cam associated therewith so that the turbulent ignited mixture therein is transferred via passageway 318 into cylinder 302. In the meantime, air which has been transferred into the space above piston 304 via transfer port 330 has been compressed in cylinder 302 and, as the ignited charge from cavity 315 is transferred into this, fuel injection from a fuel injector 323 is effected into the space above piston 304 so that an air fuel mixture so created therein is ignited by the hot gases issuing thereinto from passageway 318. The ignited gases thus expand driving piston 304 downwardly and are subsequently exhausted out of an exhaust port 326 in the side wall of the cylinder.

Scavenging of the engine is effected, as the two pistons move downwardly, by subsequent airflow through the transfer ports 310, 330 transversely across the cylinders and through a communicating port 335 between the two cylinders and thence out of the exhaust port 326. This engine provides similar characteristics to that of the engine of FIGS. 1 and 2 in that a hot mass of turbulent igniting gases is used to initiate the principal power stroke combustion process.

FIGS. 18 and 19 likewise illustrate the manner of adaptation of this principle of combustion initiation to an orbiting internal combustion engine. It utilises an internal orbiting piston member 402 which executes an orbital motion about a central axis 403. Piston member 402 is disposed in a cavity 404 in an outer casing 406. Casing 406 is closed on two faces transverse to the axis 403. Piston member 402 is interconnected with a plurality of sliding vanes 407 which are reciprocable, generally radially of axis 403, in slots 408 in casing 406. Members 407 are coupled to piston member 402 by means of pivotal connections 410 which pass through slots 411 in the piston member 402. As piston member 402 undergoes orbital motion about axis 403, spaces 412 defined between the outer peripheral surface 420 of the piston, the outer peripheral surface 415 of cavity 404 and between adjacent pairs of vanes 407 undergo cyclic volume variation. This variation is utilised to effect a cycle of induction, compression, ignition of working fluid and expansion of working fluid so that the engine operates essentially on an Otto cycle. The engine of FIGS. 18 and 19 includes a plurality of central upstanding seals 414 which project radially from slots 430 in piston member 402 at locations between each adjacent pair of vanes 407. These are biased outwardly by springs 425 but only to a limited extent at which shoulders 416 on the vanes engage shoulders 417 in slots 430.

Chambers 421 are provided in casing 406 one of these communicating with each space 412. Valve means 422, operated by a suitable cam mechanism on the engine is provided for admission of air into each chamber 421. Fuel injection means 423 are provided for admitting fuel into each chamber 421 and also into cavities 440 formed in surface 415 adjacent each chamber 421. Cavities 440 are spaced from chambers 421 in each space 412. Each cavity 440 is provided with exhaust valve means 442. As rotation takes place, each space 412 undergoes a complete operational cycle and thus the following description of operation of the engine is confined to a description of the cycle of events occuring in that space 412 shown in FIGS. 18 and 19.

Immediately prior to reaching the condition shown in FIG. 18, air has been admitted into space 412. Air induction has thus taken place into the whole of space 412, the seal 414 being, at this stage, out of contact with surface 415, and space 412 being of large volume.

Subsequently valve 422 closes and the air in space 412 is compressed by decrease in volume of space 412. Then (FIG. 18) seal 414 comes into contact with surface 415 to divide the space between the pair of vanes 407 into two. It will be seen that the part of space 412 to the left in FIG. 18, indicated by reference numeral 429, is here relatively small. Compressed air in chamber 421 is then ignited by a spark plug 428 as fuel is injected from fuel injector 423. It will be appreciated that chamber 421 is shaped so as to give turbulent mixture of air and fuel in the chamber 421 and this ignited air fuel charge is subsequently transferred across seal 414 as the latter loses contact with surface 415 pursuant to further orbital movement of piston member 402 (FIG. 19). The breaking away of the seal 414 from surface 415 occurs because of the divergence of the outer surface 440a of cavity 440 in a direction radially outwardly of axis 403; the seal is precluded from following this surface, despite its outward spring bias, because of the presence of shoulder 417. The ignited charge is thus transferred into the previously compressed air in cavity 440 and the right hand part 450 of space 412. Injection of fuel into part 450 of space 412 is effected either at the time of transfer, or shortly before this, from injector 423. Thus, the turbulent ignited charge from chamber 421 rapidly causes ignition of the fuel charge in cavity 440 and the right-hand part of space 412. The whole of space 412 then increases in volume pursuant to further orbital motion of piston member 402 to give the expansion part of the engine cycle. Exhaust valve 442 then opens to allow ignited gas in space 412 to escape. It would, of course, be possible to arrange for further input of air into cavity 440 at the time at which transfer of charge across seal 414 occurs. As in the case of the engine described with reference to FIG. 17 and the engine described with reference to FIGS. 1 and 2, the ignited charge initially effected in chamber 421 is used to thus generate a substantial heated gas front which ensures complete combustion of working fluid in a working portion of space 412.

The described engines have, of course, merely been described by way of explanation passageways it will be appreciated that many modifications may be made to these. Particularly, the engine of FIGS. 1 and 2 may be modified to increase the length of the expansion stroke of the engine by providing valve means for the exhaust port 98. Such a valve means could be arranged to be closed during a substantial initial part of the expansion cycle but to open towards the end thereof. It might, for example, be of the form shown in FIG. 20. In this instance, exhaust port 98, leading from surface 50 in housing 16, extends to an external cylindrical cavity 511. The cavity contains a valve element 512 which might be in the form of a cylindrical carbon block for example, This is provided with a series of outward passageways 516 which register with like passagweys 98a constituting exhaust port 98. A seal 517 seals the periphery of valve element 512 in cavity 511 so that outflow of gas through exhaust port 98 can only occur through passageways 516. The outer surface of valve element 512 sealingly engages against an inner substantially cylindrical surface 520 on casing 150 to prevent gas outflow through passageways 516. This sealing engagement is continuously maintained by virtue of centrifugal forces which tend to drive the member outwardly. In order to prevent excessive bearing forces generated by such centrifugal forces, a pair of weighted levers 531, 532 are provided. These have inner ends 531a, 532a which are fitted, in ball and socket fashion, into sockets in the outer periphery of valve element 512 and outer ends 531b, 532b which are weighted. The levers 531, 532 are pivoted at intermediate points on pivot pins 531c, 532c in a wall part 550 of the housing 16 surrounding cavity 511. Centrifugal action during rotation of the engine tends to cause the weighted ends 531b, 532b to move outwardly thus to cause inner ends 531a, 532a to bias the valve member inwardly. By appropriately selecting the weights of the outer ends of the levers, it is possible to arrange that the forces so generated partly cancel the forces tending to drive the valve member 512 outwardly to thereby effect the afore-mentioned minimisation of the bearing forces against casing 150.

Exhaust of gases via port 98 can only take place through passageways 516 when these are aligned with an outlet port 521 cut into casing 150. This can be positioned at any desired location such as, for example, to secure outlet of gas only at the end of each expansion cycle of gases within a chamber section 26A, 26B.

The engine of FIGS. 1 and 2 could, of course, also be modified by arranging that the inner member 14 rotated whilst the outer housing 16 was stationary. In such a case if it were desired to incorporate exhaust valving this could simply be in the form of a rotary valve which might comprise, for example, a cylindrical member sealingly rotatable in a cylindrical bore in housing 16 about an axis parallel to the axis 51 and having a transverse opening therethrough which opening could, during certain periods of rotation of the cylindrical member be in alignment with exhaust port 98 and with an outlet port in the wall of the cylindrical bore and opposite port 98. Thus, by appropriately driving the cylindrical member at a selected rate which secured a desired timing of the relative rotation period of the inner member 14 it would be possible to secure opening of the valve constituted by the cylindrical member at any desired time. The engine of FIGS. 1 and 2 might also be modified by increasing the volume of the cavities 68, 74 by increasing, say, the diameter of the somewhat ovaloid shaped sections C of these. This would reduce the compression ratio of air in these cavities and thus assist in reducing engine stress, particularly in cases where heavy charging of the cavities is effected. In cases where an exhaust valve is provided this could be arranged to allow outlet at an earlier rather than a later stage in the expansion phase of the combustion cycle to allow the exhaust gas pressure to be utilised to drive, for example, a turbo-charger.

The movement of the vanes 52, 54 is, in the described construction, effected by virtue of the camming operation of the ends thereof against surfaces 50 and 53. It will be appreciated that this is not essential as some internal means may be provided for operating the vane. Thus, for example, the vane could have a central opening therethrough and a suitable cam could be inserted in this to positively drive it back and forth. This arrangement is particularly suitable in cases when the inner member 14 was rotated since the cam, in this case, could be stationary. This arrangement also permits variation in the means for sealing the ends of the vane against the outer wall 50.

Furthermore, whilst the movement of the secondary seals 120, 122 is, in the described arrangement, effected merely by the camming action against the surface 50 and by means of spring bias, they could also be positively actuated by a suitable cam.

Again, the engine of FIGS. 1 and 2 utilises a compressor section 23 which is of substantially the same configuration as the combustion section 21. Whilst, as explained, this is advantageous in that it brings about good balance in the engine, compression could, of course, be effected by use of different forms of compressor such as are well known.

These and many other modifications may be made to the described constructions without departing from the spirit and scope of the invention as defined in the appended claims.

I claim:

1. An internal combustion engine comprising a hollow housing and an inner member therein to define a combustion chamber between the housing and inner member, mounting means for disposing the housing and inner member relatively rotatable about a longitudinal axis, said inner member having a longitudinally extending vane received therein for sliding movement transverse to said axis, said vane having opposite longitudinal surfaces which slidingly and sealingly engage an endless longitudinally extending curved outer peripheral surface of said chamber defined on said housing to divide the combustion chamber into two sections, one to either side of the vane, said sections being closed by axial end sealing surfaces associated with the chamber; sealing means within said chamber sections for dividing the chamber sections each into two separately sealed parts during periods of a cycle of relative rotation between the housing and inner member; inlet means for introducing working fluid to both parts of said chamber sections and outlet means for exhausting spent working fluid therefrom, means for igniting said working fluid in a first of said parts of the chamber section, means for transferring the ignited working fluid to the second said part of the chamber section at the end of said period for that chamber section when the two parts thereof are no longer separated by the said sealing means whereby the working fluid in such second chamber section part is ignited; and working fluid directing means for inducing circulatory movement and consequent turbulance into the working fluid in the first part of each chamber section prior to its being transferred to the second part of that chamber section.

2. An internal combustion engine as claimed in claim 1 wherein said inner member defines two first cavities in the periphery thereof, one of said first cavities being in communication with said first part of each chamber section during said periods of a cycle, and said flow directing means includes, in the outer periphery of said inner member and associated with each said cavity, at least one separate groove for directing fluid into the associated said cavity.

3. An internal combustion engine as claimed in claim 2 wherein said sealing means comprises two longitudinally extending sealing member, one associated with each chamber section and positioned on said inner member, one to each opposite side of said vane, said sealing members each contacting said outer peripheral surface during a separate one of said periods of a cycle to effect division of the chamber sections, means for reducing the size of said first part of each chamber section during said separate one of the periods of a cycle whereby working fluid introduced into such one part is compressed into the cavity communicating therewith, said grooves extending forwardly around the periphery of the inner member from said cavities whereby, as said compression takes place for each chamber section, working fluid in the said first part thereof is impelled, from the space between the said outer peripheral surface and the outer periphery of the inner member through the associated said groove and into the associated said cavity.

4. An internal combustion engine as claimed in claim 3 wherein each said cavity comprises a longitudinally extending generally cylindrical space communicating with the outer periphery of the inner member by a separate slot in said periphery extending longitudinally of the engine.

5. An internal combustion engine as claimed in claim 4 wherein said inner member defines a separate pair of said grooves converging from forward locations in the periphery of said inner member toward each of said cavities.

6. An internal combustion engine as claimed in claim 5 wherein said inner member defines two further cavities in the periphery thereof, each being in communication with a separate one of the said second chamber section parts, said sealing members being disposed at locations on the outer periphery of the inner member one between said first cavity and said further cavity associated with each chamber section, said inner member further defining two channels in the outer periphery thereof, one extending between said first cavity and said further cavity of each chamber section.

7. An internal combustion engine as claimed in claim 6 wherein the depth of each said further channel increases toward the associated first cavity and a central land of the inner member disposed within said further channel adjacent said separate slot.

8. An internal combustion engine as claimed in claim 7 wherein each said land decreases in width longitudinally of the engine from the associated said first cavity toward the sealing member separating that first cavity from its associated further cavity.

9. An internal combustion engine as claimed in claim 8 wherein each said land terminates at the sealing member of its associated chamber section.

10. An internal combustion engine as claimed in claim 6 wherein each said further cavity is longitudinally extended and communicates with said outer periphery of said inner member by a separate slot in the outer periphery, the inner member defining, adjacent that longitudinal edge of each such slot nearest its associated first cavity, and undercut tongue.

11. An internal combustion engine as claimed in claim 6 wherein said first cavities and said further cavities are open to at least one longitudinal end surface of the inner member and of said end sealing surfaces including port means for communication with the open ends of the cavities at times during said relative rotation for admission of air to said cavities and chamber section.

12. An internal combustion engine as claimed in claim 11 wherein said cavities are closed at the longitudinal ends thereof opposite said longitudinal end surface and said inlet means comprises fuel injectors, one positioned for directing fluid into each said cavity; spark plugs disposed in said first cavities at the closed ends thereof for igniting said working fluid in the first cavities.

13. An internal combustion engine as claimed in claim 11 wherein said port means communicate with a source of pressurized air.

14. An internal combustion engine as claimed in claim 13 wherein said source of pressurized air includes a compressor, said compressor including a casing affixed to said housing and an inner element coaxial with said inner member.

15. An internal combustion engine as claimed in claim 14 wherein said casing and said inner element defines a compressor chamber therebetween, the casing defining an endless longitudinally extending curved outer peripheral surface of the compressor chamber, said inner element being fixed relative to said inner member and having a longitudinally extending compressor vane received therein for sliding movement transverse to said axis, said compressor vane having opposed longitudinal surfaces in sliding and sealing engagement with the outer peripheral surface of the compressor chamber whereby the compressor chamber is divided into two compressor sections, one to either side of the compressor vane, said compressor sections being closed by axial end sealing surfaces associated with the compressor chamber.

16. An internal combustion engine as claimed in claim 15 wherein said inner element defines a central air inlet passageway and a transverse opening through the inner element in communication with the transverse opening, said compressor vane being slidingly and sealingly engaged in said transverse opening, said compressor vane defining an air flow groove extending for communication between said air inlet passageway and the compressor chamber only when the compressor vane projects more than a predetermined amount of one side of the inner element.

17. An internal combustion engine as claimed in claim 16 wherein there are two of said air flow grooves one selectively communicating with each of said sections.

18. An internal combustion engine as claimed in claim 17 wherein the outer peripheral surface of the compressor chamber comprises two opposed curved portions one of smaller radius than the other but with centers of curvature on the said axis, these portions being interconnected by respective opposed portions of smoothly varying curvature, said inner element being cylindrical and of curvature substantially the same as that of the smaller radius portion of the outer peripheral surface of the compressor chamber, said air flow grooves being to opposite sides of the compressor vane and extending from a central portion of the compressor vane oppositely towards respective ones of the sealing surfaces of the compressor vane, said housing and casing including passage means communicating between said compressor chamber and said inlet ports.

19. An internal combustion engine as claimed in claim 18 wherein the said smaller radius curved portion of the compressor chamber is diametrically opposed to the correspondingly smaller radius curved portion of the peripheral surface of the combustion chamber.

20. An internal combustion engine as claimed in claim 18 together with valve means positioned in said passage means for preventing outflow of air and working fluid from the combustion chamber to the compressor chamber.

21. An internal combustion engine as claimed in claim 1 wherein the said vane comprises a generally rectangular body, said longitudinal surfaces being defined on longitudinal strip elements carried at longitudinally extending side edges of the body, said strip elements having innermost longitudinally extending convex surfaces, and longitudinally extending concave surfaces at said side edges of said body corresponding with said convex surfaces whereby the strip elements are capable of limited rotation relative to the body and about respective longitudinally extending axes.

22. An internal combustion engine as claimed in claim 1 wherein said outer peripheral surface consists of two opposed curved portions one of smaller radius than the other but with centers of curvature on said axis, said portions being interconnected by respective opposed portions of smoothly varying curvature, said inner member being cylindrical and of curvature substantially the same as that of the smaller radius portion of said outer peripheral surface, said mounting means including means for contacting said sealing means on said smaller radius portion during movement therepast whereby said chamber section parts are defined during passage of the respective sealing means over the smaller radius portion.

23. An internal combustion engine as claimed in claim 22 wherein said inlet means includes means for introducing working fluid into said further chambers immediately prior to loss of contact between said outer peripheral surface and the sealing means.

24. An internal combustion engine as claimed in claim 23, wherein said inlet means comprises fuel injectors for injecting working fluid into said first cavities and said further cavities.

25. An internal combustion engine as claimed in claim 23 wherein said housing defines an exhaust opening means communicating with said chamber.

26. An internal combustion engine as claimed in claim 25 wherein said inner member is fixed and said housing is mounted for rotation therearound, an outer casing surrounding said housing, said exhaust opening means including a further opening in said outer casing, seal means positioned on said housing adjacent said exhaust opening means and providing a sealed passageway leading to the inner periphery of the outer casing whereby passage of exhaust gases is allowed from the housing through the casing only when the openings in the housing and outer casing are aligned during rotation of the housing.

27. An internal combustion engine comprising a hollow housing, a member in said housing, a combustion chamber defined between the member and housing, vane means in said combustion chamber and extending between said member and said housing for dividing the combustion chamber into at least two sections, means for mounting the member and housing for relative movement to effect periodic variation of the volume of said sections of the combustion chamber, seal means within at least one of said chamber sections, means for alternately placing said seal means in contact with both said member and said housing for periodically dividing said one chamber section to form first and second chamber section parts during a first time period and separating said seal means from at least one of said member and said housing during a second time period, first inlet means for introducing a first working fluid charge into said first chamber section part during said first time period, second inlet means for introducing a second working fluid charge into said second chamber section part immediately prior to said second time period for ignition thereof by the ignited first working fluid charge at the beginning of said second time period, exhaust means for exhausting spent working fluid from said chamber section, one of said member and housing defining in the periphery thereof bounding the combustion chamber a cavity positioned to be located at said first chamber section part during said first time period for receiving said first working fluid charge, means for igniting said first working fluid charge in said cavity immediately prior to said second time period, and working fluid directing means operable to direct said first working fluid charge along a narrow track into said cavity to create turbulance in the first working fluid charge as said ignition thereof takes place.

28. An internal combustion engine as claimed in claim 27 wherein said cavity is formed in the periphery of said member and said fluid flow directing means comprises a pair of grooves in the periphery of said member and leading to said cavity to converge thereat.

29. An internal combustion engine as claimed in claim 28 wherein said chamber is defined between an internal peripheral surface of the housing and said periphery of said member, said member being of cylindrical configuration and said peripheral surface consisting of two opposed curved portions one of smaller radius than the other with centers of curvature coaxial with said member, the said portions being interconnected by respective opposed portions of smoothly varying curvature, the radius of curvature of said inner member corresponding substantially to that of the smaller radius portion of said peripheral surface and said seal means comprising a seal strip extending lengthwise of the member whereby contact with said housing occurs when the seal strip passes around said smaller radius portion, the inner member having thereon a second cavity positioned at the opposite side of said seal strip as the first mentioned cavity, and further flow directing means extending around the periphery of said inner member from said first mentioned cavity to the second cavity, for directing ignited working fluid from the first cavity to the second cavity.

30. An internal combustion engine comprising a hollow housing, a member in said housing, a combustion chamber defined between the member and housing, vane means in said combustion chamber and extending between said member and said housing for dividing the combustion chamber into at least two sections, means mounting the member and housing for relative movement to effect periodic variation of the volume of said sections of the combustion chamber, seal means within at least one of said chamber sections, means for alternatively placing said seal means in contact with both said member and said housing for periodically dividing said one chamber section to form first and second chamber section parts during a first time period and separating said seal means from at least one of said member and said housing during a second time period, first inlet means for introducing a first working fluid charge into said first chamber section part during said first time period, second inlet means for introducing a second working fluid charge into said second chamber section part immediately prior to said second time period for ignition thereof by the ignited first working fluid charge at the beginning of said second time period, exhaust means for exhausting spent working fluid from said chamber section, one of said member and housing defining in the periphery thereof bounding the combustion chamber a cavity positioned to be located at said first chamber section part during said first time period for receiving said first working fluid charge, means for reducing the size of said first chamber section part during said first time period for compressing said first working fluid charge in said cavity, means for igniting said first working fluid charge in said cavity immediately prior to said second time period, said cavity having a substantially reentrant and substantially closed curved surface of generally cylindrical configuration extending lengthwise of the engine and communicating with the periphery by a narrow slot whereby to induce circulation and consequent turbulance in said first working fluid charge prior to ignition thereof.

* * * * *